United States Patent [19]

Karcher et al.

[11] Patent Number: 4,782,574
[45] Date of Patent: Nov. 8, 1988

[54] METHOD FOR MOUNTING A SOCKET

[75] Inventors: Thomas D. Karcher, Rocky River; John Weston, Columbia Station, both of Ohio

[73] Assignee: Tuthill Corporation, Cleveland, Ohio

[21] Appl. No.: 18,717

[22] Filed: Feb. 25, 1987

[51] Int. Cl.4 ............................................. B23Q 17/00
[52] U.S. Cl. ........................................ 29/407; 29/240
[58] Field of Search ................. 29/407, 706, 707, 240; 73/1 C; 81/473, 474, 475, 460, 467, 479, 483; 411/2, 3, 4

[56] References Cited

U.S. PATENT DOCUMENTS

| | | |
|---|---|---|
| 3,331,267 | 7/1967 | Tietge . |
| 3,753,625 | 8/1973 | Fabrizio et al. . |
| 4,215,600 | 8/1980 | Kesselman ............................ 81/63.2 |
| 4,682,520 | 7/1987 | Gray ...................................... 81/471 |

FOREIGN PATENT DOCUMENTS

| | | |
|---|---|---|
| 2626142 | 12/1977 | Fed. Rep. of Germany .......... 411/3 |
| 2140523 | 11/1984 | United Kingdom .................... 411/4 |

Primary Examiner—Timothy V. Eley
Attorney, Agent, or Firm—Tarolli, Sundheim & Covell

[57] ABSTRACT

The socket of a plug and socket type coupling is mounted with an assembly tool which makes sure that a threaded connection between the socket and a mounting member is properly tightened. When the socket is to be mounted, the socket is operated to a disengaged condition and the assembly tool is inserted into the socket. The socket is then operated to an engaged condition. This causes locking elements in the socket to engage the assembly tool to hold the assembly tool in the socket. Torque is then applied to the assembly tool. When the threaded connection has been tightened to a desired extent, a breakaway section of the assembly tool fractures to interrupt the transmission of force to the socket. The socket is then operated to the released condition and the end portion of the broken assembly tool is removed from the socket. A plug is then inserted in the socket to enable fluid under pressure to be conducted through the coupling.

10 Claims, 5 Drawing Sheets

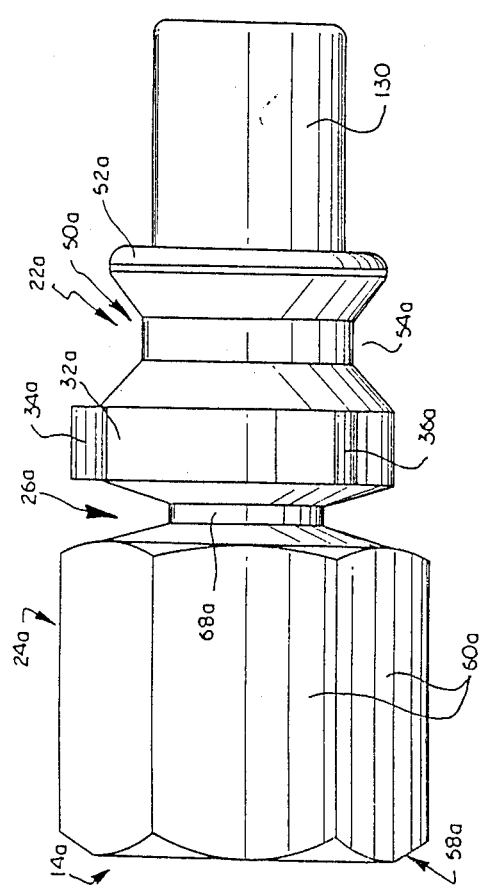
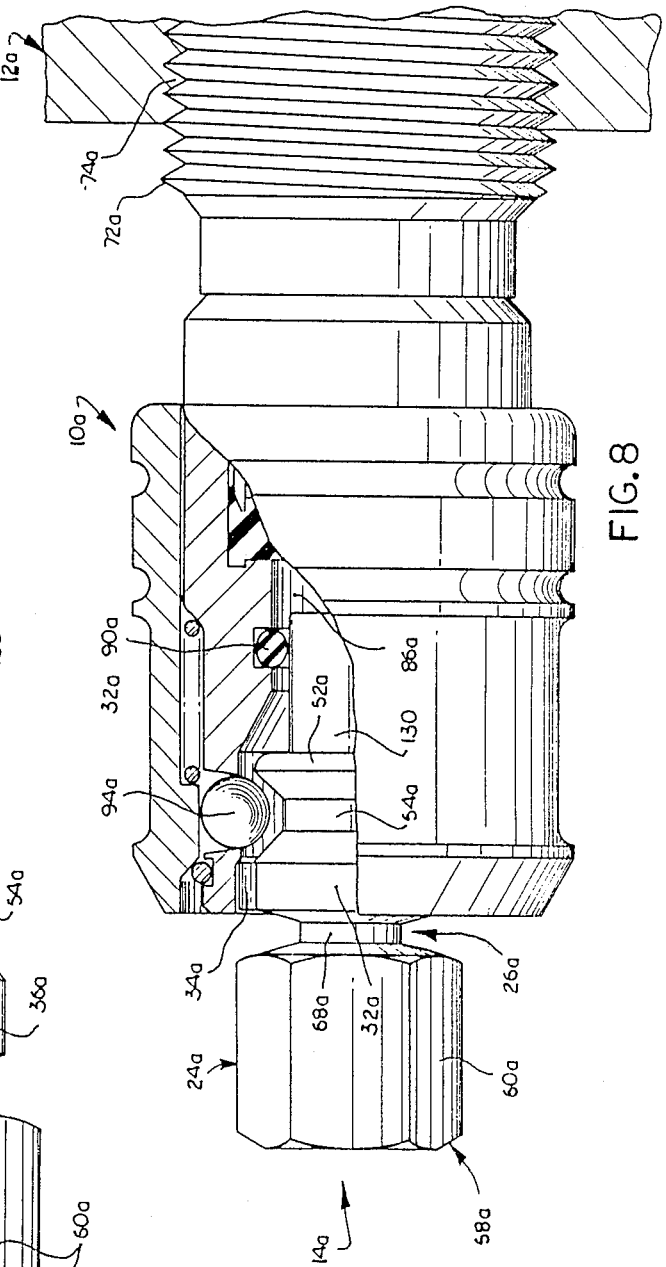

METHOD FOR MOUNTING A SOCKET

BACKGROUND OF THE INVENTION

The present invention relates to a method and tool which are used to limit the torque applied to the socket of a quick connect coupling assembly during mounting of the socket.

Quick connect coupling assemblies have been utilized to interconnect conduits which conduct gas for cooking appliances and other gas-fired devices in a manner similar to that disclosed in U.S. Pat. No. 4,088,436 entitled "Gas Distribution System" and issued May 9, 1978 and in U.S. Pat. No. 4,280,523 entitled "Thermal Responsive Coupling", issued July 28, 1981. The coupling assemblies disclosed in these patents are of the one-way shut-off quick-connect type and have sockets which releasably engage a plug. When the plug and socket are interconnected, fluid, that is, natural or manufactured gas, is conducted through the coupling assembly.

When a socket of a coupling assembly is to be connected with a mounting member, such as the shut off valve for an LP gas cylinder, threads on the socket engage mating threads on the mounting member. If excessive force is used to tighten the threaded connection between the socket and mounting member, the threads may be stripped or deformed to such an extent that the connection between the socket and mounting member will leak. However, if insufficient force is used to tighten the threaded connection between the socket and mounting member, the connection may also leak. Therefore, it is important that the threaded connection between the socket and mounting member be tightened with a torque sufficient to prevent leakage, but not so great as to cause deformation of the threads.

SUMMARY OF THE INVENTION

The present invention provides a new and improved method and apparatus for mounting a socket of a plug and socket type coupling assembly. When the socket is to be mounted, an inner end portion of an assembly tool is inserted into the socket. A force is then applied to an outer end portion of the assembly tool to rotate the threads on the socket relative to stationary threads on a mounting member. When the threaded connection between the socket and mounting member has been tightened to a desired extent, a breakaway portion of the assembly tool fractures to interrupt the application of force to the socket and threaded connection. Since the breakaway portion of the assembly tool is sized to fracture when a predetermined torque is applied to the assembly tool, the threaded connection between the socket and mounting member is tightened to a desired extent.

During the tightening of the threaded connection between the socket and the mounting member, the assembly tool may tend to slip out of the socket. To prevent this from happening, the assembly tool has a retaining groove which is engaged by locking elements in the socket. Once the threaded connection has been tightened to a desired extent with a resulting fracturing of the assembly tool, the assembly tool is removed from the socket and a plug inserted into the socket. The same locking elements which previously held the assembly tool in the socket will now hold the plug in the socket.

When the socket is shipped, an O-ring seal in the socket may be displaced and fail to properly engage the plug as it is subsequently inserted into the socket. The assembly tool may be provided with a leading or inner end portion which holds the annular seal ring in place. By shipping the socket with the assembly tool in the socket, displacement of the annular seal is prevented.

Accordingly, it is an object of this invention to provide a new and improved method and apparatus for mounting a socket of a plug and socket type coupling assembly and wherein an assembly tool interrupts the application of force to a socket and a threaded connection between the socket and a mounting member when the threaded connection has been properly tightened.

It is another object of this invention to provide a new and improved method and apparatus as set forth in the preceding object and wherein the assembly tool is held in the socket during tightening of the threaded connection by engagement of locking elements in the socket with the assembly tool.

Another object of this invention is to provide a new and improved assembly tool for limiting the torque applied to a socket and wherein the assembly tool includes a breakaway portion which fractures upon the application of a predetermined torque to the assembly tool and a retainer portion which is engaged by locking elements in the socket to hold the assembly tool against withdrawal from the socket during tightening of a connection between the socket and a mounting member.

BRIEF DESCRIPTION OF THE DRAWINGS

The foregoing and other objects and features of the present invention will become more apparent upon a consideration of the following description taken in connection with the accompanying drawings, wherein:

FIG. 7 is an enlarged side view, similar to FIG. 2, of an embodiment of the assembly tool having a seal ring retaining end portion; and FIG. 8 is a fragmentary sectional view, similar to FIG. 6, illustrating how the seal ring retaining end portion of the assembly tool of FIG. 7 holds a seal ring in place.

DESCRIPTION OF ONE SPECIFIC PREFERRED EMBODIMENT OF THE INVENTION

General Description

Figure 1:
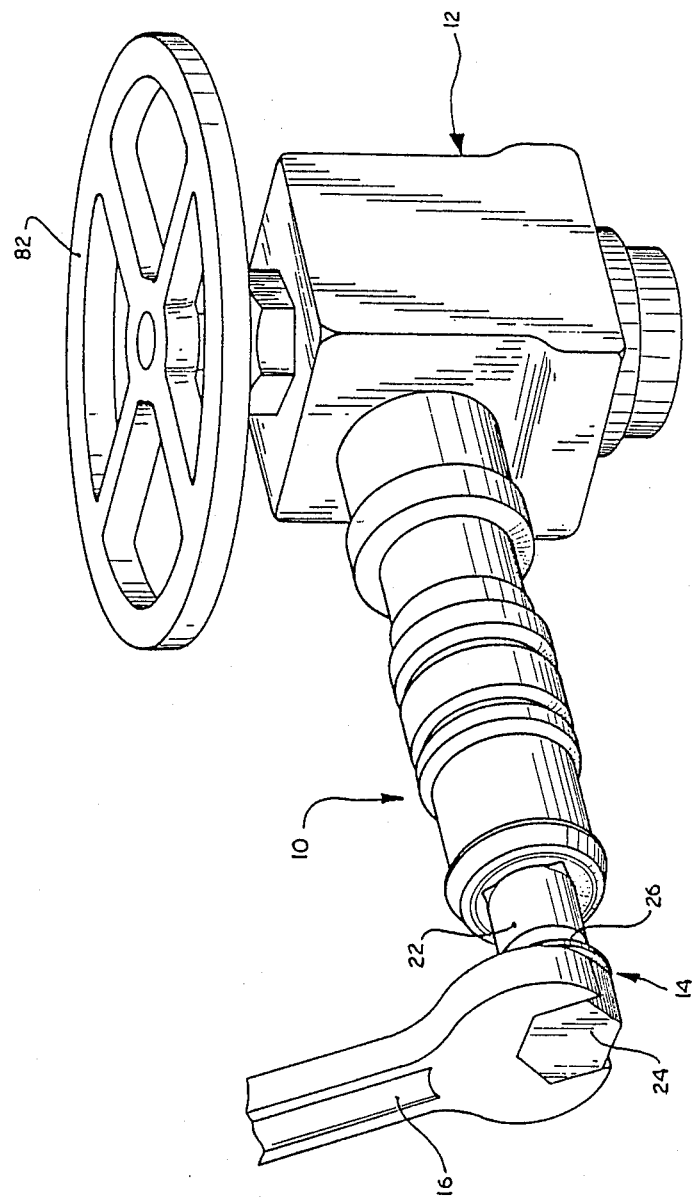
FIG. 1 is a schematic pictorial illustration depicting the manner in which an assembly tool is utilized to tighten a connection between a socket and a mounting member.

A socket 10 (FIG. 1) of a plug and socket type coupling assembly is connected with a valve 12 of an LP gas cylinder with an assembly tool 14. The assembly tool 14 limits the amount of torque transmitted to the socket 10 from a wrench 16 during tightening of a threaded connection (FIG. 6) between the socket and valve 12. Although the valve 12 is connected with an LP gas cylinder (not shown), the assembly tool 14 could be utilized to connect the socket 10 with a mounting member other than a valve for an LP gas cylinder.

The socket 10 (FIG. 1) receives the plug (not shown) of a plug and socket type coupling assembly. The plug is connected with a fluid conduit which receives gas from the LP gas cylinder. The socket 10 is of the same general construction and cooperates with a plug in the same general manner as disclosed in U.S. Pat. No. 4,280,523 entitled "Thermal Responsive Coupling", issued July 28, 1981.

The assembly tool 14 has an inner end portion 22 which is inserted into a plug receiving cavity in the socket 10. An outer end portion 24 of the assembly tool 14 is engaged by the wrench 16. A breakaway portion 26 interconnects the inner and outer end portions 22 and 24 of the assembly tool 14.

Rotation of the wrench 16 rotates the assembly tool 14 and socket 10 relative to the cylinder valve 12. Thus, torque is applied to the outer end portion 24 with the assembly tool 14 by the wrench 16. The breakaway portion 26 transmits the torque from the outer end portion 24 of the assembly tool to the inner end portion 22 of the assembly tool. The inner end portion 22 of the assembly tool transmits the torque to the socket 10 to rotate the socket relative to the cylinder valve 12.

In accordance with a feature of the present invention, when a predetermined torque has been applied to the assembly tool 14 by the wrench 16, the breakaway portion 26 fractures to interrupt the transmission of torque to the socket 10. This prevents stripping of the threaded connection between the socket 10 and cylinder valve 12 due to the application of excessive torque. It also ensures that sufficient torque is applied to the socket 10 to tighten the threaded connection between the socket and cylinder valve 12 enough to prevent leakage of gas at the threaded connection.

Once the assembly tool 14 has fractured due to the application of sufficient torque to properly tighten the threaded connection between the socket 10 and cylinder valve 12, the inner end portion 22 of the assembly tool 14 is removed from the socket 10 and a plug is inserted. The plug may be connected either directly to a fluid conduit or to a fixture, such as a pressure regulator for gas from the cylinder. The plug and socket cooperate in the same general manner disclosed in U.S. Pat. No. 4,088,436 entitled "Gas Distribution System", issued May 9, 1978.

Assembly Tool

The assembly tool 14 (FIG. 2) is formed as one piece and includes the inner end portion 22 which applies force to the socket 10 to rotate the socket, the outer end portion 24 to which force is applied by the wrench 16, and the breakaway portion 26 which fractures when a force in excess of a predetermined force is applied to the outer end portion 24 of the assembly tool. By fracturing at a predetermined force, the assembly tool 14 ensures that the threads on the socket 10 and cylinder valve 12 are tightened with enough force to prevent leaks without deformation of the threads.

The inner end portion 22 of the assembly tool 14 has a cylindrical body section 32 which is inserted into the plug receiving cavity of socket 10. A plurality of force transmitting lugs 34, 36, and 38 (FIG. 3) project radially outwardly from the cylindrical body portion 32. The lugs 34, 36 and 38 are received in similarly shaped recesses formed in the socket 10 to transmit force from the assembly tool 14 to the socket upon rotation of the assembly tool by the wrench 16.

The lug 36 has force transmitting surfaces 42 and 44 (FIGS. 2 and 3) which engage force transmitting surfaces formed in the socket 10. The force transmitting surface 42 on the lug 36 of the assembly tool 14 applies force against a mating surface on the socket 10 when the assembly tool 14 is being rotated to tighten righthand threads. Similarly, the force transmitting surface 44 on the lug 36 applies force against a mating surface on the socket 10 when the assembly tool 14 is being rotated to tighten lefthand threads.

The cylinder valve 12 and socket 10 have lefthand threads. Therefore, when the threaded connection between the socket 10 and cylinder valve 12 is being tightened, force is transmitted from the assembly tool 22 to the socket through the surface 44 of the lug 36. It should be understood that the lugs 34 and 38 have the same configuration as the lug 36 and have force transmitting surfaces corresponding to the force transmitting surfaces 42 and 44 on the lug 36.

During tightening of the socket 10, the assembly tool 14 is held in the socket by a retainer section 50 (FIG. 2) disposed at one end of the inner end portion 22 of the assembly tool 14. The retainer section 50 has a circular flange 52 which cooperates with the cylindrical body section 32 to define an annular retainer groove or recess 54. The flange 52 and groove 54 are disposed in a coaxial relationship with the cylindrical body section 32. The groove 54 receives locking elements of the socket 10 to hold the assembly tool 14 in engagement with the socket during tightening of the threaded connection between the socket and the cylinder valve 12. Thus, the socket locking elements engage the annular flange 52 to block withdrawal of the assembly tool 14 from the socket 10.

The outer end portion 24 (FIG. 2) of the assembly tool 14 has a hexagonal head 58 with wrenching flats 60. The head 58 is coaxial with the cylindrical body section 32. A circular rim 64 has a diameter which is the same as the distance between opposite corners of the head 58. Therefore, in this embodiment of the invention, the rim 64 engages the side of the wrench 16 to prevent the wrench from slipping off the wrenching flats 60 in a direction toward the socket 10 during tightening of the threaded connection between the socket and the cylinder valve 12.

The breakaway portion 26 includes a cylindrical torque limiting section 68 which is coaxial with the head section 58 and body section 32. The torque limiting section 68 is sized to fracture when a predetermined torque is required to rotate the threads on the socket 10 relative to the threads on the cylinder valve 12. Thus, when the force required to rotate the socket 10 relative to the cylinder valve 12 reaches a predetermined magnitude, the torque limiting section 68 breaks or fractures to separate the outer end portion 24 of the assembly tool 14 from the inner end portion 22 of the assembly tool.

Figure 2:
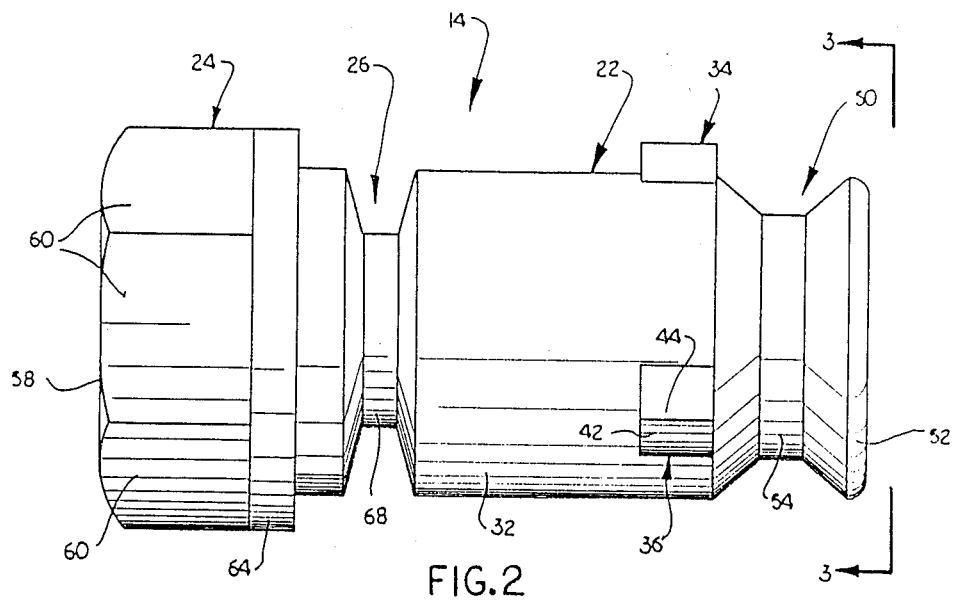
FIG. 2 is an enlarged side view of the assembly tool of FIG. 1.
Figure 3:
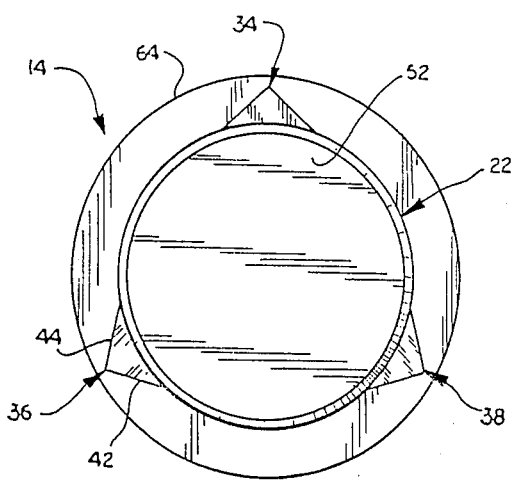
FIG. 3 is an end view, taken generally along the line 3—3 of FIG. 2, illustrating force transmitting lugs on the assembly tool.

In one specific embodiment of the invention, the assembly tool 14 was one piece of glass-filled nylon and had the same configuration as shown in FIGS. 2 and 3. This specific assembly tool had an overall length of approximately 1.2 inches and a body section 32 with a diameter of approximately 0.5 inches. The torque limiting section 68 of the breakaway portion 26 had a diameter of approximately 0.25 inches. The foregoing dimensions are a function of the size of the socket 10 with which the assembly tool 14 is to be used and the desired maximum tightening torque to be applied to the threaded connection between the socket 10 and cylinder valve 12. It should be understood that the foregoing specific dimensions have been set forth only for purposes of clarity of illustration and it is contemplated that the assembly tool 14 could be constructed with dimensions other than these specific dimensions.

Socket

Figure 6:
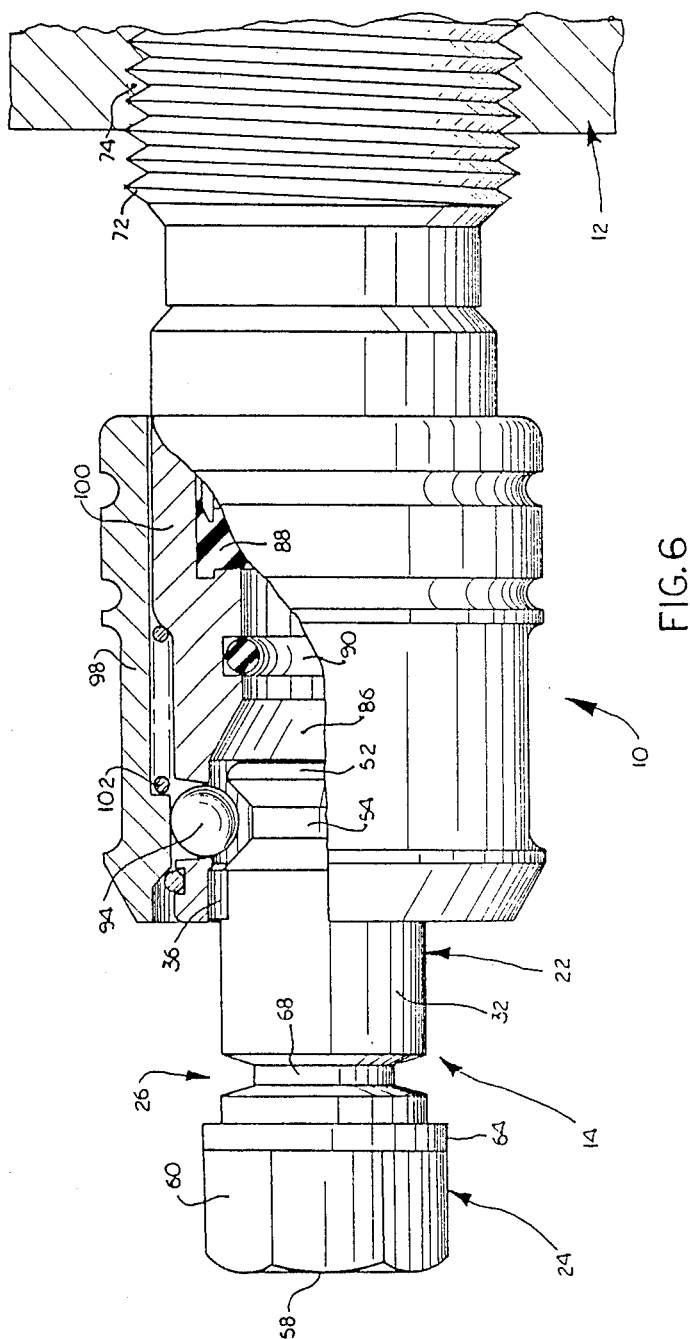
FIG. 6 is a fragmentary sectional view illustrating the manner in which the assembly tool of FIG. 2 is held in the socket of FIG. 4.

The socket 10 (FIG. 4) has external threads 72 which engage internal threads 74 on the cylinder valve 12 in the manner shown in FIG. 6. An annular seal ring 78 (FIG. 4) is provided at the inner end of the socket 10 to sealingly engage a surface of the cylinder valve 12. The cooperation between the seal 78 and the cylinder valve and the cooperation between the external threads 72 on the socket 10 and the internal threads on the cylinder valve prevents any leakage of gas when a handle 82 (FIG. 1) on the cylinder valve 12 is rotated to open the cylinder valve.

The socket 10 (FIG. 4) has a plug receiving cavity 86 which is disposed in a coaxial relationship with the threads 72 and seal ring 78. The outer (left) end portion of the socket cavity 86 has a generally cylindrical configuration. The flange 52 and body section 32 on the assembly tool 14 (FIG. 2) can be inserted into the socket cavity 86. Of course, the socket cavity 86 is sized to receive the plug of the plug and socket coupling.

The socket 10 has a valve (not shown) which engages a resilient annular seat 88 to block a flow of gas or fluid through the socket 10 when the plug is disconnected from the socket. When the plug is inserted into the socket cavity 86, the leading end of the plug engages the valve to move the valve to the open condition and to sealingly engage the resilient seat 88 in a manner similar to that disclosed in the aforementioned U.S. Pat. No. 4,280,523. An annular seal ring or O-ring 90 engages the leading end of the plug to redundantly prevent leakage of gas between the plug and socket. The annular seal ring 90 also prevents discharge to atmosphere during the short time during connection or disconnection that the valve is disengaged from the seat 88, and the leading edge of the plug is not in sealing contact with the seat.

A plurality of locking elements 94 are mounted in the socket 10 to engage the plug and hold the plug in the socket cavity 86. The locking elements 94, in the illustrated embodiment of the socket 10, are spherical balls which engage an annular ring on the plug to hold the plug in the socket cavity 86. Although the locking elements 94 have a spherical configuration, it is contemplated that they could have other configurations, such as the configuration shown in U.S. Pat. No. 3,423,110 entitled "Quick-Connective Coupling" and issued Jan. 21, 1969.

Figure 4:
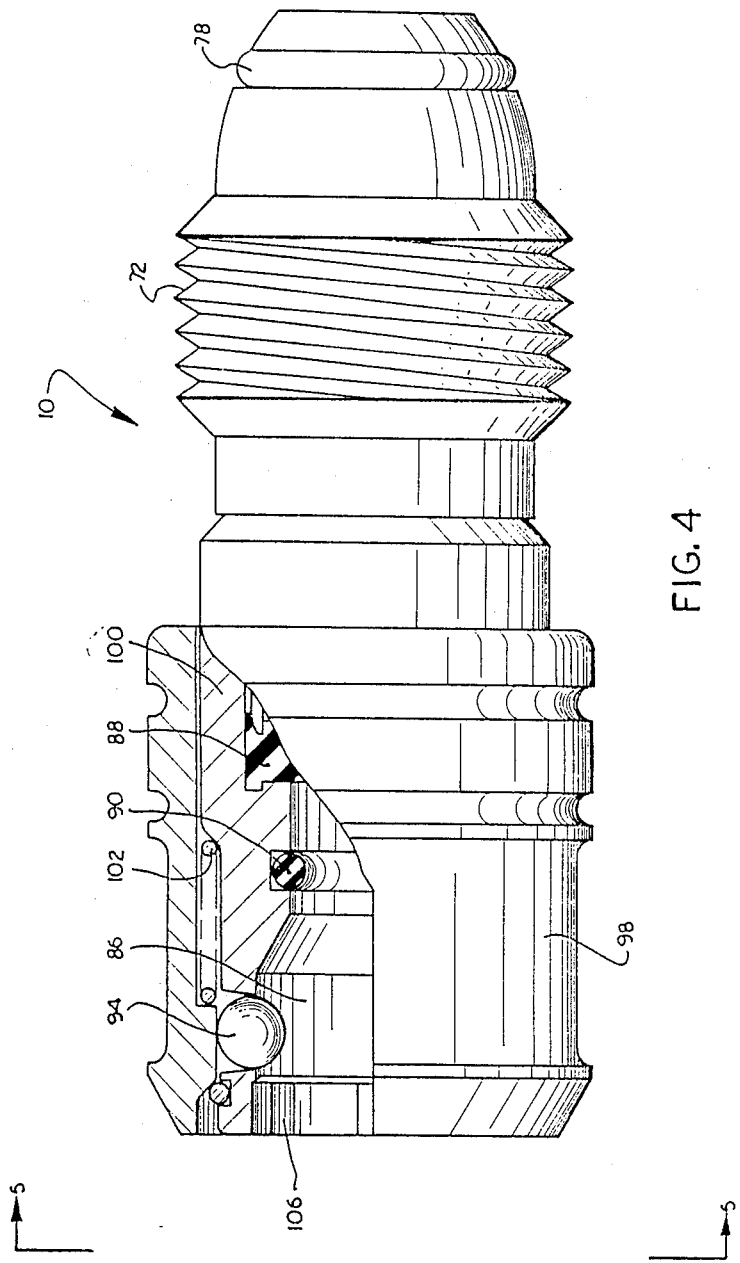
FIG. 4 is an enlarged and partially broken away view of the socket of FIG. 1.

The locking elements 94 are shown in FIG. 4 in an engaged condition in which they can engage a plug to prevent withdrawal of the plug from the socket cavity 86. The locking elements 94 can be moved radially outwardly from the socket cavity 86 to a disengaged condition in which the locking elements are ineffective to block withdrawal of the plug from the socket cavity. The socket 10 is operated between the engaged condition and disengaged condition by moving a cylindrical sleeve 98 axially along a generally cylindrical body 100 of the socket.

When the sleeve 98 is in the engaged position of FIG. 4, the inside of the sleeve holds the spherical locking elements 94 radially inwardly to block withdrawal of the plug from the socket cavity 86. When the sleeve 98 is pulled axially inwardly to a retracted position, that is toward the right as viewed in FIG. 4, the locking elements 94 are released and can be cammed outwardly by the plug to enable the plug to be withdrawn from the socket cavity 86. The cylindrical sleeve 98 is urged to the engaged position shown in FIG. 4 by a biasing spring 102 which is disposed between the inside of the sleeve and the outside of the socket body 100.

Figure 5:
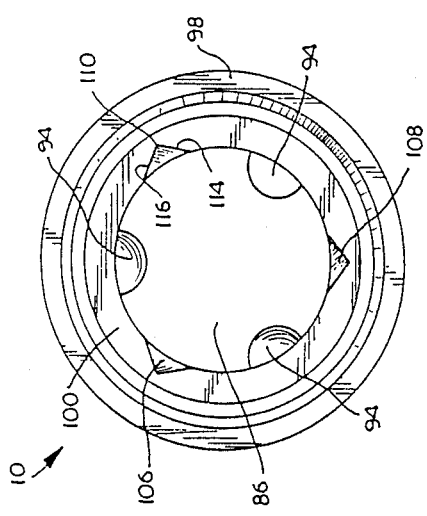
FIG. 5 is an end view, taken generally along the line 5—5 of FIG. 4, illustrating socket recesses and locking elements.

In accordance with one of the features of the invention, when the assembly tool 14 is used to tighten a threaded connection between the socket 10 and cylinder valve 12, the locking elements 94 project into the recess 54 and engage the annular flange 52 (FIG. 2) on the assembly tool 14 to hold the assembly tool in the socket cavity 86 (FIG. 6). At this time, the lugs 34, 36 and 38 (FIG. 3) on the body section 32 of the assembly tool 14 engage similarly shaped recesses 106, 108 and 110 (FIG. 5) formed in the socket body 100 adjacent to the outer end of the socket cavity 86. Since the locking elements 94 hold the assembly tool in the socket 10, the lugs 34, 36 and 38 cannot slip out of the recesses 106, 108 and 110. If the assembly tool 14 was not held in the socket 10 by the locking elements 94, the lugs 34, 36 and 38 and recesses 106, 108 and 110 would have to be much larger and/or the wrench 16 would have to be carefully manipulated.

The recess 110 has a pair of side surfaces 114 and 116 which can engage the side surfaces 42 and 44 on the lug 36 of the assembly tool 14. Force is transmitted from the side surface 42 on the lug 36 of the assembly tool 14 to the side surface 114 of the recess 110 to rotate the socket body 100 in a clockwise direction (as viewed in FIG. 5) during tightening of a righthand threaded connection between the socket 10 and valve 12. Similarly, for a lefthand threaded connection between the socket 10 and cylinder valve 12, force is transmitted from the surface 44 of the lug 36 on the assembly tool 14 to the surface 116 of the recess 110 to rotate the socket body 100 in a counterclockwise direction (as viewed in FIG. 5). Since the recesses 106, 108 and 110 in the socket body 100 all have the same configuration and the lugs 34, 36 and 38 on the body section 32 all have the same configuration which corresponds to the configuration of the recesses, any one of the lugs can be inserted into any one of the recesses.

Operation

When the socket 10 is to be installed in the closed cylinder valve 12, the assembly tool 14 is inserted into the socket while it is separate from the cylinder valve. To accomplish this, the socket sleeve 98 is retracted against the influence of the coil spring 102 to release the locking elements 94. The inner end portion 22 of the assembly tool 10 is then inserted into the socket cavity 86 (FIG. 6).

As the leading end portion of the assembly tool 14 moves into the socket cavity 86, the flange 52 on the assembly tool engages the locking elements 94 and cams them outwardly. Since the force transmitting lugs 34, 36 and 38 on the inner end portion 22 of the assembly tool will probably be angularly offset from the recesses 106, 108 and 110 in the socket body 100, the assembly tool 14 is rotated slightly about its axis to move the force transmitting lugs into alignment with the recesses. Continued movement of the assembly tool 14 into the socket cavity 86 moves the force transmitting lugs 34, 36 and 38 into the socket body recesses 106, 108 and 110 and moves the annular retainer groove 54 on the leading end of the assembly tool 14 into radial alignment with the locking elements 94.

The socket sleeve 98 is then released for outward movement under the influence of the biasing spring 102. As the socket sleeve 98 moves axially outwardly along the socket body 100, the locking elements 94 are cammed radially inwardly into the retaining groove 54 (FIG. 6). The socket sleeve 98 holds the locking elements 94 against radially outward movement. Therefore, any attempt to withdraw the assembly tool 14 from the socket cavity 86 is blocked by engagement of the flange 52 with the locking elements 94.

After the assembly tool 14 has been inserted into the socket 10, the external threads 72 on the socket are moved into engagement with the internal threads 74 on the closed cylinder valve 12. The socket body 100 is manually rotated to initiate connection of the socket threads 72 with the cylinder valve threads 74.

A force is then applied by the wrench 16 to the outer end portion 24 of the assembly tool 14. This force rotates the socket 10 in a direction to increase the extent of engagement between the socket threads 72 and the cylinder valve threads 74. The force applied by the wrench 16 to the outer end portion 24 of the assembly tool 14 is transmitted through the breakaway portion 26 to the inner end portion 22 of the assembly tool. The force which is transmitted to the inner end portion 22 of the assembly tool presses side surfaces on the lugs 34, 36 and 38 against side surfaces of the recesses 106, 108 and 110 in the socket body 100.

For example, if the force transmitting lug 36 on the assembly tool 14 was received in the recess 110 in the socket body 100 and if the socket thread 72 and mounting thread 74 were righthand threads, a force would be transmitted from the surface 42 of the lug 36 to the surface 114 of the recess 110. This force would rotate the socket body 100 in a clockwise direction as viewed in FIG. 5. Similarly, if the threads 72 and 74 were lefthand threads, a force would be transmitted from the surface 44 of the lug 36 to the surface 116 on the recess 110 to rotate the socket body 100 in a counterclockwise direction as viewed in FIG. 5.

As the threaded connection between the socket 10 and cylinder valve 12 is tightened, the torque required to rotate the socket relative to the valve increases. When the connection between the threads 72 and 74 has been tightened with a predetermined torque, the force applied against the outer end portion 24 of the assembly tool 14 causes the torque limiting section 68 of the breakaway portion 26 to fracture. This interrupts the transmission of force from the outer end portion 24 of the assembly tool 14 to the inner end portion 22 of the assembly tool and the socket 10.

Upon breaking of the torque limiting section 68, the outer end portion 24 of the assembly tool 14 is separated from the inner end portion 22 which remains in the socket 10. In order to remove the inner end portion 22 of the assembly tool 14 from the socket 10, the socket is operated to a disengaged condition. This is accomplished by manually pulling the sleeve 98 inwardly, that is toward the right as viewed in FIG. 6, against the influence of the biasing spring 102. When the sleeve 98 has been retracted, the spherical locking elements 94 can be cammed radially outwardly by the circular flange 52 on the inner end portion 22 of the broken assembly tool 14. Therefore, the inner end portion 22 of the assembly tool 14 can be readily pulled out of the socket cavity 86. The sleeve 98 is then released and the biasing spring 102 returns the sleeve to the engaged or extended position shown in FIG. 6.

Once the socket 10 has been connected with the closed cylinder valve 12 in the manner previously explained, a fluid conduit is connected in fluid communication with the cylinder valve by inserting a plug (not shown) into the socket 10. This is accomplished by again pulling the sleeve rightwardly (as viewed in FIG. 4) to a retracted position and moving the plug axially into the socket cavity 86. As the plug moves into the socket cavity, the locking elements 94 are first cammed outwardly and then engage an annular retaining groove formed on the plug. Once the retaining groove in the plug has moved into alignment with the locking elements 94, the sleeve 98 is released and the biasing spring 102 moves the sleeve back to the engaged or extended position of FIG. 4 to hold the plug in place. Therefore, the locking elements 94 are first effective to hold the assembly tool 14 in the socket 10 and are subsequently effective to hold a plug in the socket.

Once the plug has been connected with the socket 10, the cylinder valve 12 is opened by turning the handle 82. This enables gas from a cylinder connected with the cylinder valve 12 to be conducted through the socket 10 and plug. The gas flows from the plug to a conduit leading to a gas fired appliance.

In the foregoing description, it has been assumed that the assembly tool 14 would be inserted into the socket 10 before the threads on the socket engage the threads on the cylinder valve 12. However, the threads on the socket 10 could be manually turned into engagement with the cylinder valve threads before the assembly tool 14 is inserted into the socket 10. Although the socket 10 has been described herein as having external threads 72 and the cylinder valve 12 as having internal mounting threads 74, it is contemplated that the socket could be provided with internal threads and the cylinder valve with external threads if desired.

Second Embodiment of the Invention

When the socket 10 is shipped, the annular seal ring or O-ring 90 may become displaced in the socket and assume a "set" which results in intereference between the seal ring and the plug when it is inserted into the socket. Since the seal ring is not properly positioned relative to the socket when the plug is inserted, the seal ring probably will not sealingly engage the plug. In accordance with a feature of the embodiment of the invention illustrated in FIGS. 7 and 8, the assembly tool is constructed to hold an O-ring seal in the socket in a circular configuration until a plug is positioned in the socket. Since the embodiment of the invention illustrated in FIGS. 7 and 8 is generally similar to the embodiment of the invention illustrated in FIGS. 1–6, similar numerals will be utilized to designate similar components, the suffix letter "a" being associatd with the numerals of FIGS. 7 and 8 in order to avoid confusion.

The assembly tool 14a (FIG. 7) is formed as one piece and includes an inner end portion 22a which applies force to a socket 10a (FIG. 8) to rotate the socket, an outer end portion 24a which is engaged by the wrench 16 (FIG. 1), and a breakaway portion 26a which fractures when a force in excess of a predetermined force is applied to the outer end portion 24a of the assembly tool. By fracturing at a predetermined force, the assembly tool 14a ensures that the threads 72a (FIG. 8) of the socket 10a and the threads 74a on the cylinder valve 12a are tightened with enough force to prevent leaks without deformation of the threads.

The inner end portion 22a of the assembly tool 14a (FIG. 7) has a cylindrical body section 32a which is inserted into a plug receiving cavity 86a in the socket 10a. A pair of force transmitting lugs 34a, 36a and a third force transmitting lug (not shown), corresponding to the force transmitting lug 38a, project radially outwardly from the cylindrical body portion 32a. The lugs are received in similarly shaped recesses, corresponding to the recesses 106, 108 and 110 in the socket 10, to transmit force from the assembly tool 14a to the socket 10a upon rotation of the assembly tool by the wrench 16.

During tightening of the socket 10a, the assembly tool 14a is held in the socket by a retainer section 50a (FIG. 7) disposed at one end of the cylindrical body section 32a. The retainer section 50a has a circular flange 52a which cooperates with the cylindrical body section 32a to define an annular retainer groove or recess 54a. The retainer groove 54a receives locking elements or balls 94a in the socket 10a (FIG. 8) to hold the assembly tool 14a in engagement with the socket 10a during shipping and during tightening of the threaded connection between the socket 10a and cylinder valve 12a. Thus, socket locking elements 94a engage the annular flange 52a to block withdrawal of the assembly tool 14a from the socket 10.

The outer end portion 24a of the assembly tool 14a has a hexagonal head 58a with wrenching flats 60a. The breakaway portion 26a includes a cylindrical torque limiting section 68a which is coaxial with the head section 58a and body section 32a. The torque limiting section 68a is sized to fracture when a predetermined torque is required to rotate the threads 72a on the socket 10a relative to the threads 74a on the cylinder valve 12a. Thus, when the force required to rotate the socket 10a relative to the cylinder valve 12a reaches a predetermined magnitude, the torque limiting section 68a breaks or fractures to separate the outer end portion 24a of the assembly tool 14a from the inner end portion 22a of the assembly tool.

In accordance with a feature of this embodiment of the invention, the assembly tool 14a has a leading end section 130 which telescopically engages the O-ring 90a to hold the O-ring in a circular configuration in an annular groove 132 (FIG. 8) in the socket 10a during shipping of the socket. Thus, the leading end portion 130 of the assembly tool 14a is cylindrical and has an outside diameter which is slightly greater than the inside diameter of the unstressed or free O-ring 90a. Therefore, the leading end section 130 of the assembly tool 14a applies a radially outwardly directed force against annular inner surface of the O-ring 90a to maintain the O-ring in an annular configuration in which it engages the groove 132 during shipping.

By maintaining the O-ring 90a in an annular configuration, the leading end portion 130 of the assembly tool 14a prevents the O-ring from sagging or being deflected inwardly to a position in which the O-ring would not sealingly engage a plug when the plug is inserted into the socket 10a. This prevents the O-ring from taking a set during a relatively long shipping and/or storage time. The locking elements 94a on the socket 10a cooperate with the retainer section 50a to hold the cylindrical leading end portion 130 of the assembly tool 14a in engagement with the O-ring 90a until the socket 10a has been installed in the manner previously described.

Conclusion

The present invention provides a new and improved method and apparatus for mounting a socket 10 of a plug and socket type coupling assembly. When the socket 10 is to be mounted, a first or inner end portion 22 of an assembly tool 14 is inserted into the socket. A force is then applied to an outer end portion 24 of the assembly tool 14 to rotate the threads 72 on the socket 10 relative to stationary threads 74 on a mounting member or valve 12.

When the threaded connection between the socket 10 and mounting member 12 has been tightened to a desired extent, a breakaway portion 26 of the assembly tool 14 fractures. This interrupts the application of force to the threaded connection. Since the breakaway portion 26 of the assembly tool 14 is sized to fracture when a predetermined torque is applied to the assembly tool, the threaded connection between the socket 10 and mounting member 12 is tightened to a desired extent.

During the tightening of the threaded connection between the socket 10 and the mounting member 12, the assembly tool 14 may tend to slip out of the socket. To prevent this from happening, the assembly tool 14 has a retaining groove 54 which is engaged by the locking elements 94 in the socket 10 to hold the assembly tool 14 in the socket cavity 86 during tightening of the threaded connection. Once the threaded connection has been tightened to a desired extent with a resulting fracturing of the assembly tool 14, the assembly tool is removed from the socket 10 and a plug inserted into the socket. The same locking elements 94 which previously held the assembly tool 14 in the socket 10 will now hold the plug in the socket.

In the embodiment of the invention shown in FIGS. 7 and 8, the assembly tool 14a has a seal ring retaining end portion 130 which holds the seal ring 90a in place during shipping. By shipping the socket 10a with the assembly tool 14a in the socket, displacement of the seal ring 90a from a desired orientation relative to the socket is prevented.

Having described one specific preferred embodiment of the invention, the following is claimed:

1. A method of mounting a socket of a plug and a socket type coupling assembly, said method comprising the steps of providing a socket operable between released and engaged conditions and having locking elements which are engagable with a plug to hold the plug in the socket when the socket is in the engaged condition and are ineffective to hold the plug in the socket when the socket is in the released condition, engaging threads on the socket with threads on a mounting member, operating the socket to the released condition, inserting an assembly tool into the socket while the socket is in the released condition, engaging a plurality of force transmitting surfaces on the socket with a plurality of force transmitting surfaces on the assembly tool, operating the socket to the engaged condition after inserting the assembly tool into the socket, engaging the locking elements with the assembly tool to block withdrawal of the assembly tool from the socket when the socket is in the engaged condition, applying force to the assembly tool tending to rotate the assembly tool in a direction in which the extent of engagement of the threads on the socket with the threads on the mounting member increases, transmitting force from the assembly tool to the socket through engagement of the force transmitting surfaces on the assembly tool with the force transmitting surfaces on the socket, interrupting the transmission of force from the assembly tool to the socket when the force exceeds a predetermined magnitude, operating the socket to the released condition, and removing the assembly tool from the socket while the socket is in the released condition.

2. A method as set forth in claim 1 further including the steps of inserting a plug into the socket after having performed the foregoing steps, and conducting fluid through the plug and socket while the plug is inserted in the socket.

3. A method as set forth in claim 1 wherein said step of inserting an assembly tool into the socket is performed prior to performance of said step of engaging threads on the socket with threads on a mounting member.

4. A method as set forth in claim 1 wherein said step of inserting an assembly tool into the socket is performed after performance of said step of engaging the threads on the socket with threads on a mounting member.

5. A method as set forth in claim 1 wherein said step of interrupting the transmission of force from the assembly tool to the socket includes fracturing the assembly tool.

6. A method as set forth in claim 1 wherein said step of inserting the assembly tool into the socket includes engaging an O-ring in the socket with the assembly tool and holding the O-ring in a recess with the assembly tool.

7. A method as set forth in claim 6 wherein said step of removing the assembly tool from the socket includes moving the assembly tool out of engagement with the O-ring, said method further including inserting a plug into the socket after having performed the foregoing steps, said step of inserting a plug into the socket including engaging the O-ring with the plug, and conducting fluid through the plug and socket while the plug is inserted in the socket.

8. A method of mounting a socket of a plug and a socket type coupling assembly, said method comprising the steps of providing a socket having an O-ring seal, holding the O-ring seal in a desired orientation relative to the socket by inserting an assembly tool into the socket, engaging a plurality of force transmitting surfaces on the socket with a plurality of force transmitting surfaces on the assembly tool, transporting the socket from a location where the assembly tool is inserted into the socket to a remote installation location, holding the O-ring seal in the desired orientation relative to the socket by engaging the O-ring seal with the assembly tool while transporting the socket, engaging threads on the socket with threads on a mounting member at the installation location, applying force to the assembly tool tending to rotate the assembly tool in a direction in which the extent of engagement of the threads on the socket with the threads on the mounting member increases, transmitting force from the assembly tool to the socket through engagement of the force transmitting surfaces on the assembly tool with the force transmitting surfaces on the socket, interrupting the transmission of force from the assembly tool to the socket when the force exceeds a predetermined magnitude, and removing the assembly tool from the socket.

9. A method as set forth in claim 8 further including the steps of inserting a plug into the socket after having performed the foregoing steps, engaging the O-ring seal with the plug during insertion of the plug into the socket, and conducting fluid through the plug and socket while the plug is inserted in the socket.

10. A method as set forth in claim 8 wherein said step of interrupting the transmission of force from the assembly tool to the socket includes fracturing the assembly tool.

* * * * *